US011288162B2

(12) United States Patent
Ohana

(10) Patent No.: US 11,288,162 B2
(45) Date of Patent: Mar. 29, 2022

(54) OPTIMIZING INTERACTION FLOWS

(71) Applicant: Optum Services (Ireland) Limited, Dublin (IE)

(72) Inventor: Bruno Ohana, Dublin (IE)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 491 days.

(21) Appl. No.: 16/293,894

(22) Filed: Mar. 6, 2019

(65) Prior Publication Data

US 2020/0285553 A1    Sep. 10, 2020

(51) Int. Cl.
| | | |
|---|---|---|
| *G06F 11/34* | (2006.01) | |
| *H04L 29/08* | (2006.01) | |
| *H04L 12/58* | (2006.01) | |
| *G10L 15/26* | (2006.01) | |
| *H04L 67/50* | (2022.01) | |
| *H04L 51/02* | (2022.01) | |

(52) U.S. Cl.
CPC ...... *G06F 11/3428* (2013.01); *G06F 11/3438* (2013.01); *G10L 15/26* (2013.01); *H04L 51/02* (2013.01); *H04L 67/22* (2013.01)

(58) Field of Classification Search
CPC .. G06F 11/3428; G06F 11/3438; H04L 51/02; H04L 67/22; H04M 3/5166; G10L 15/26
See application file for complete search history.

(56) References Cited

U.S. PATENT DOCUMENTS

| | | | | |
|---|---|---|---|---|
| 8,831,208 B2* | 9/2014 | Suendermann | ..... | H04M 3/4936 379/272 |
| 10,812,654 B2* | 10/2020 | Wozniak | ............... | H04M 3/242 |
| 2008/0189171 A1* | 8/2008 | Wasserblat | ....... | G06Q 10/06398 705/7.32 |
| 2009/0043583 A1* | 2/2009 | Agapi | ..................... | G10L 13/04 704/260 |
| 2010/0104075 A1* | 4/2010 | Wang | .................... | H04M 3/493 379/88.18 |
| 2012/0022938 A1* | 1/2012 | McNea | ................ | G06Q 30/016 705/14.42 |
| 2016/0352907 A1* | 12/2016 | Raanani | ................. | G06N 20/00 |
| 2017/0118336 A1* | 4/2017 | Tapuhi | ............... | G06F 16/3329 |
| 2020/0257680 A1* | 8/2020 | Danyi | ................. | G06F 11/3409 |
| 2020/0285553 A1* | 9/2020 | Ohana | ................. | G06F 11/3428 |

OTHER PUBLICATIONS

Wawra, "Building Better Phone Trees With Twilio Using Multivariate Testing," Jun. 30, 2014, [online], [retrieved from the Internet Jun. 18, 2019], <URL: https://www.twilio.com/blog/2014/06/building-better-phone-trees-with-twilio.html> (14 pages).

(Continued)

*Primary Examiner* — Philip J Chea
*Assistant Examiner* — Mohammed Ahmed
(74) *Attorney, Agent, or Firm* — Alston & Bird LLP

(57) ABSTRACT

Methods, apparatus, systems, computing devices, computing entities, and/or the like for optimizing interaction flows. For example, upon receiving an inbound interaction, the interaction is routed to either a baseline interaction flow or one of a plurality of experimental interaction flows. Using one or more target metrics, the experimental interaction flows can be monitored and further configured to optimize the interaction flows and parameters.

18 Claims, 15 Drawing Sheets

(56) References Cited

OTHER PUBLICATIONS

Plum Fuse+: Tutorial: Introduction Videos, [online], [retrieved from the Internet Jun. 18, 2019] <URL: https://www.plumvoice.com/docs/fuse/tutorial> (9 pages).

Plum Fuse+: Documentation: Modules, [online], [retrieved from the Internet Jun. 18, 2019] <URL: https://www.plumvoice.com/docs/fuse/modules> (3 pages).

Myers, "Visualizing Your Transfer Rate With VoiceTrends Diagnostic Flow," Dec. 1, 2016, [online], [retrieved from the Internet Jun. 18, 2019] <URL: https://www.plumvoice.com/resources/blog/voicetrends-transfer-rate-diagnostic-flow/> (5 pages).

Myers, "How to Do A/B Analysis on Voice Applications," Plum|Voice, Sep. 22, 2016, [online], [retrieved from the Internet Jun. 18, 2019] <URL: https://www.plumvoice.com/resources/blog/how-to-a-b-test-voice-applications/> (5 pages).

Cowan, "5 Easy Steps to A/B Testing Your Contact Centre Call Plan," [online], [retrieved from the Internet Jun. 18, 2019] <URL: https://www.vonage.com/business/perspectives/5-easy-steps-to-ab-testing-your-contact-centre-call-plan/> (6 pages).

Burstein, "Call Center Optimization: How a NonProfit Increased Donation Rate 29% With Call Center Testing," Marketing Experiments, Nov. 14, 2017, [online], [retrieved from the Internet Jun. 18, 2019] <URL: https://marketingexperiments.com/a-b-testing/how-nonprofit-increased-donations-by-testing> (5 pages).

"Top A/B Testing Tips From Acumen's Lean Data Experiments," Data & Impact, Mar. 9, 2017, [online], [retrieved from the Internet Jun. 18, 2019] <URL: https://www.plusacumen.org/journal/top-ab-testing-tips-acumen%E2%80%99s-lean-data-experiments> (8 pages).

"New Artificial Intelligence-Powered Routing Engine By Genesys Creates World's Most Predictive Customer Experiences," Genesys, May 2, 2018, [online], [retrieved from the Internet Jun. 18, 2019] <https://www.prnewswire.com/news-releases/new-artificial-intelligence-powered-routing-engine-by-genesys-creates-worlds-most-predictive-customer-experiences-300639920.html> (6 pages).

"Customer Journey Platform The Analytics-Driven Contact Center," Broadsoft, [online], [retrieved from the Internet Jun. 18, 2019] <URL: https://cjp.broadsoft.com/contact-center-performance-solutions/contact-center-analytics/?hsCtaTracking=1cacd10a-43d5-47be-b6dc-86b9853f269f%7C09f31a78-9a36-484d-a44e-b936a51abd74> (10 pages).

\* cited by examiner

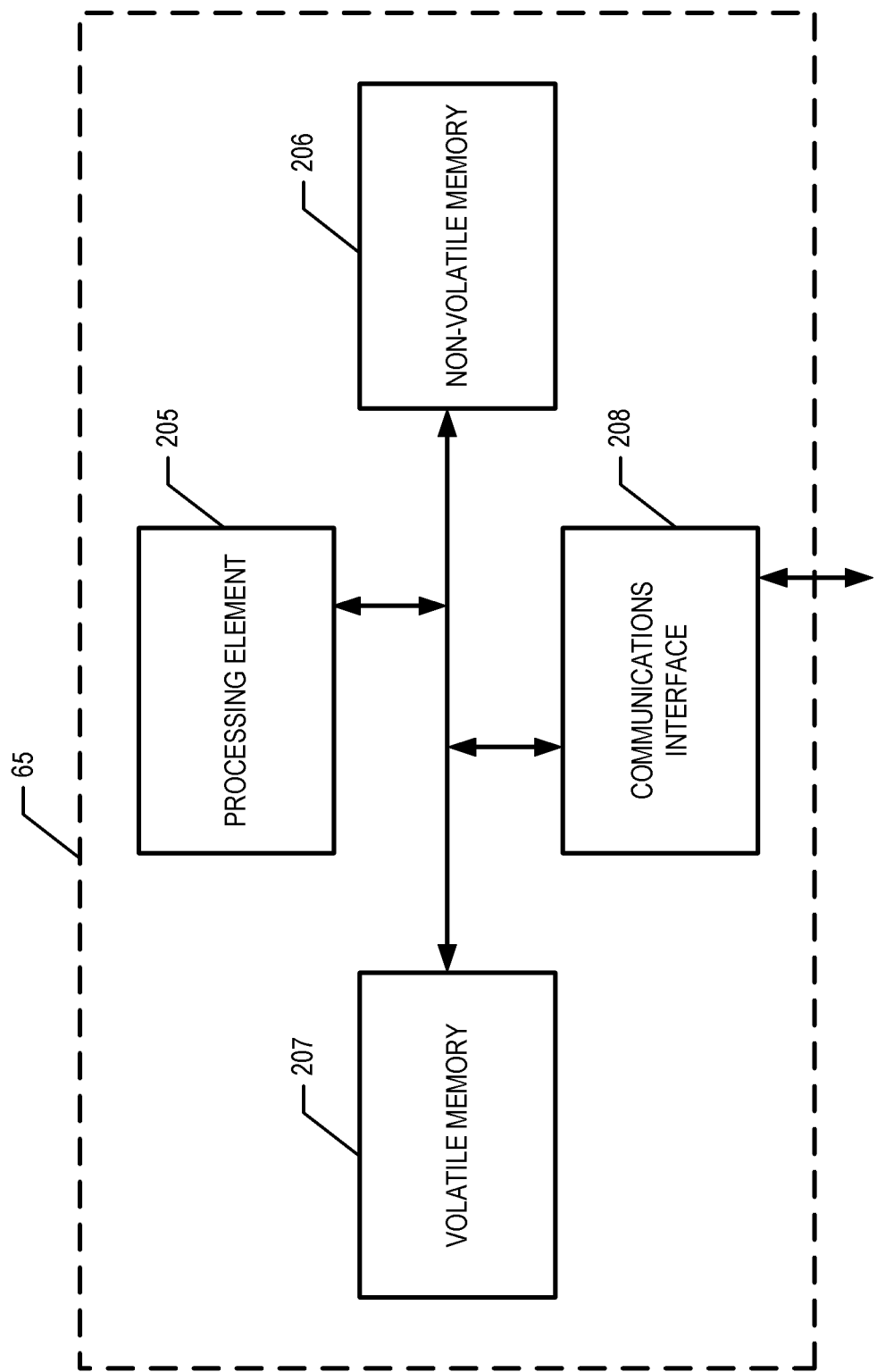

OPTIMIZING INTERACTION FLOWS

BACKGROUND

User interaction platforms, such as interactive voice response (IVR) systems, digital assistant systems, and chatbot systems are often used to drive automated or semi-automated interactions between users and various types of entities. These interactions platforms may provide audible or textual prompts and menus that use business logic to control interaction flows (a) to collect user information/data before handing off the interaction to an agent, and/or (b) provide automated answers to users.

Successful user interactions with interaction systems are a significant driver of positive user experiences for interactions. Thus, difficult to navigate interaction flows can lead to poor user interaction experiences, which can be gauged by a target metric collected from the interaction platform, such as: abandonment rate (e.g., the rate of user interactions disconnecting before solving a query); and authentication rate (e.g., the rate of user interactions successfully identified by the interaction platform that reduces handling time by agents).

Through applied effort and ingenuity, various embodiments satisfy the above-mentioned needs as discussed in greater detail herein.

BRIEF SUMMARY

In general, embodiments of the present invention provide methods, apparatus, systems, computing devices, computing entities, and/or the like.

In accordance with one aspect, a method is provided. In one embodiment, the method comprises receiving an inbound interaction, wherein the inbound interaction is selected from the group consisting of a voice-based interaction and a textual-based interaction; determining whether to route the inbound interaction to a baseline interaction flow or one of a plurality of experimental interaction flows based at least in part on a configurable distribution ratio; responsive to determining to route the inbound interaction to one of the plurality of experimental interaction flows, routing the inbound interaction to a first experimental interaction flow of the plurality of experimental interaction flows; automatically determining that the first experimental interaction flow satisfies a threshold for a target metric; and responsive to automatically determining that the first experimental interaction flow satisfies the threshold for the target metric, committing the first experimental interaction flow as the baseline interaction flow.

In accordance with another aspect, a computer program product is provided. The computer program product may comprise at least one computer-readable storage medium having computer-readable program code portions stored therein, the computer-readable program code portions comprising executable portions configured to receive an inbound interaction, wherein the inbound interaction is selected from the group consisting of a voice-based interaction and a textual-based interaction; determine whether to route the inbound interaction to a baseline interaction flow or one of a plurality of experimental interaction flows based at least in part on a configurable distribution ratio; responsive to determining to route the inbound interaction to one of the plurality of experimental interaction flows, route the inbound interaction to a first experimental interaction flow of the plurality of experimental interaction flows; automatically determine that the first experimental interaction flow satisfies a threshold for a target metric; and responsive to automatically determining that the first experimental interaction flow satisfies the threshold for the target metric, commit the first experimental interaction flow as the baseline interaction flow.

In accordance with yet another aspect, a computing system comprising at least one processor and at least one memory including computer program code is provided. In one embodiment, the at least one memory and the computer program code may be configured to, with the processor, cause the computing system to receive an inbound interaction, wherein the inbound interaction is selected from the group consisting of a voice-based interaction and a textual-based interaction; determine whether to route the inbound interaction to a baseline interaction flow or one of a plurality of experimental interaction flows based at least in part on a configurable distribution ratio; responsive to determining to route the inbound interaction to one of the plurality of experimental interaction flows, route the inbound interaction to a first experimental interaction flow of the plurality of experimental interaction flows; automatically determine that the first experimental interaction flow satisfies a threshold for a target metric; and responsive to automatically determining that the first experimental interaction flow satisfies the threshold for the target metric, commit the first experimental interaction flow as the baseline interaction flow.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2A is a schematic of an exemplary interaction server system in accordance with certain embodiments of the present invention;

Figure 4A:
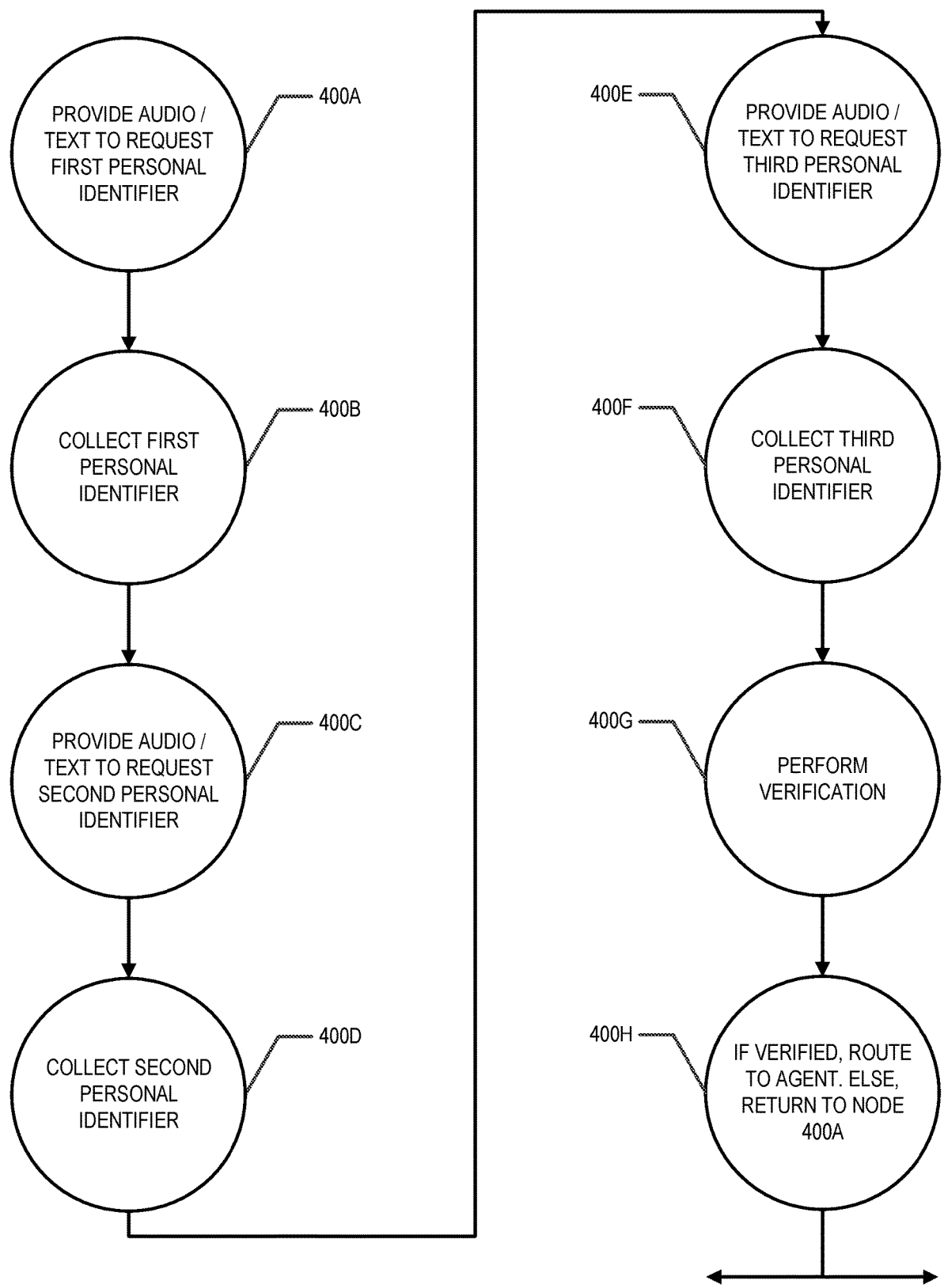
Figure 4B:
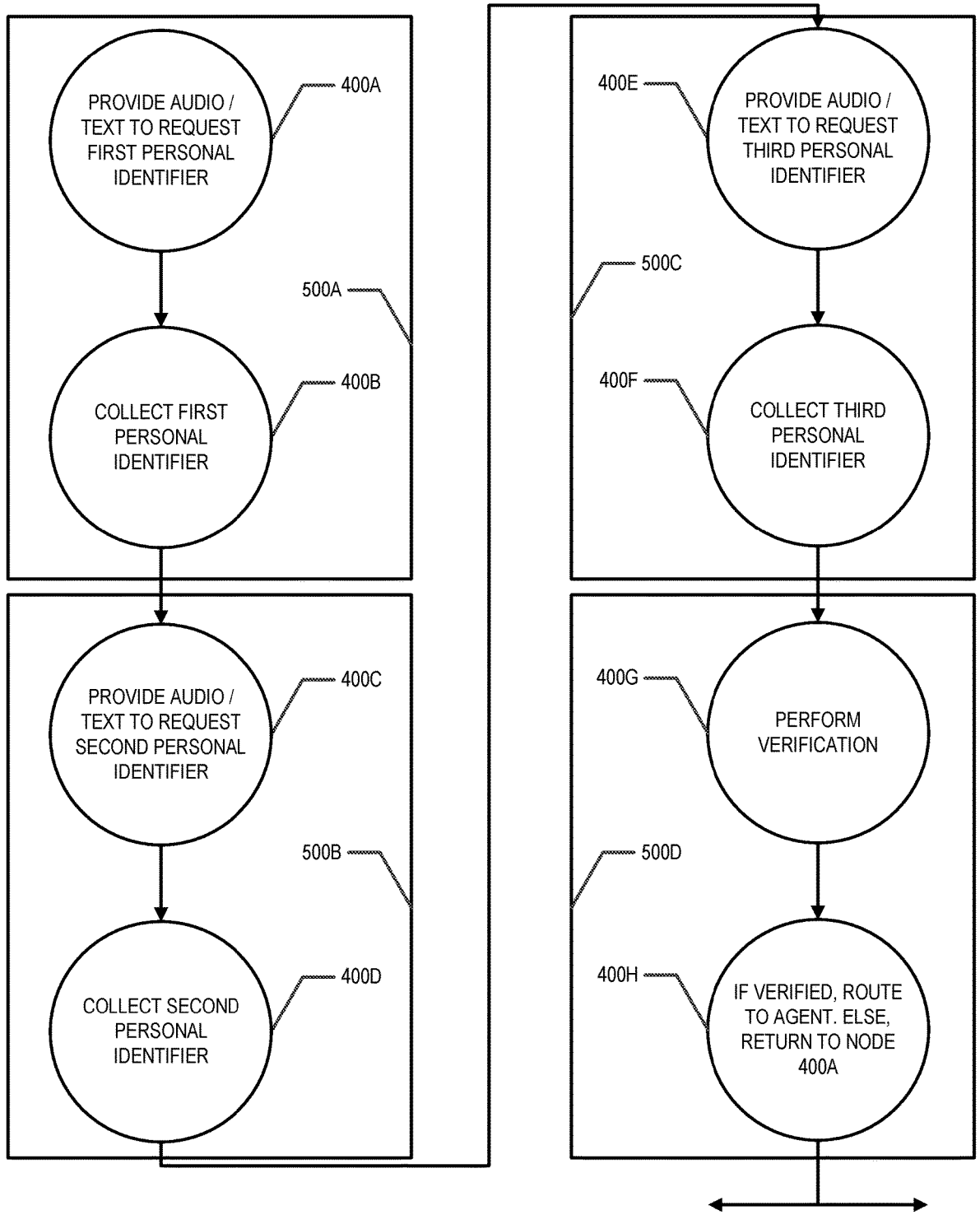
Figure 4C:
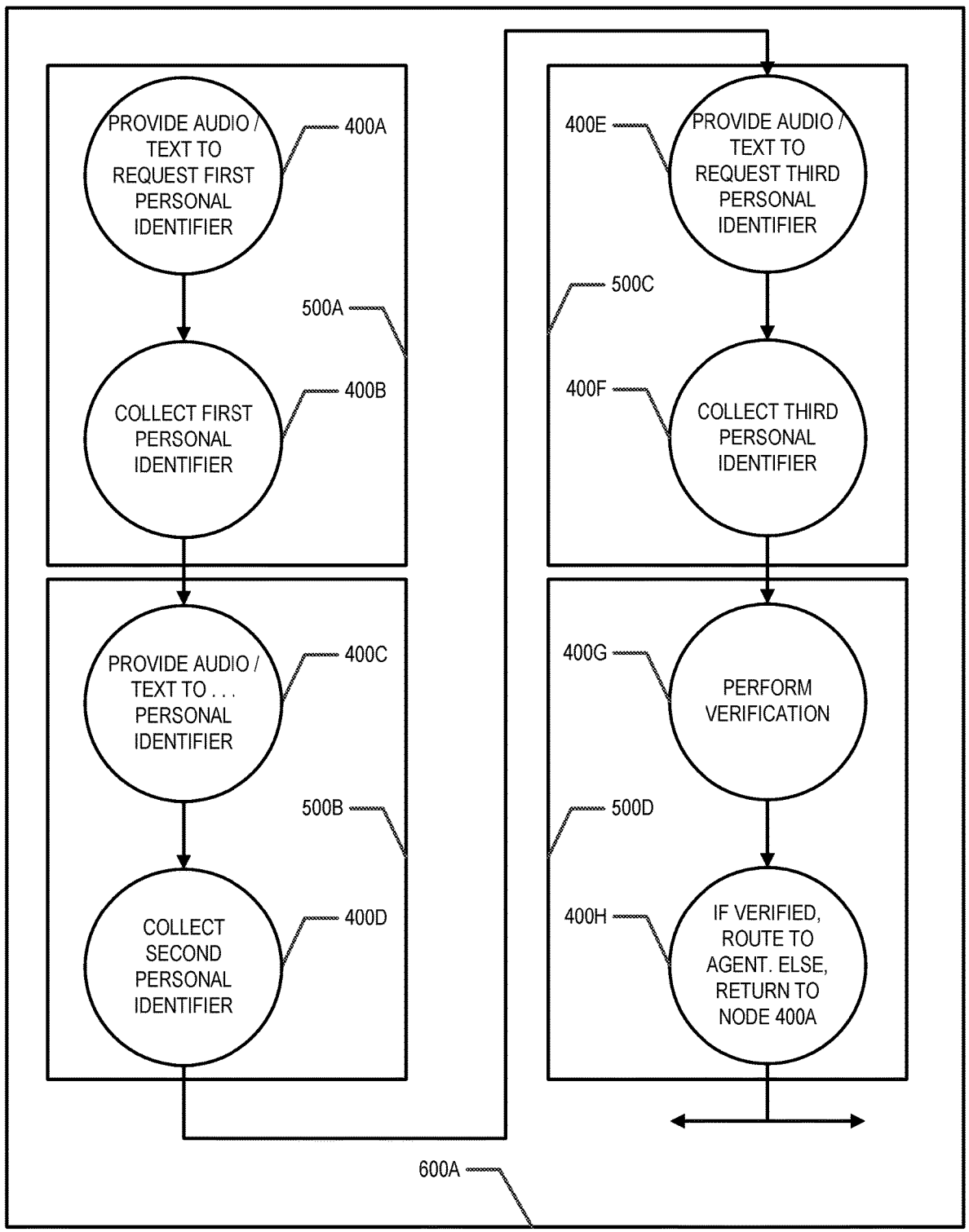
Figure 5A:
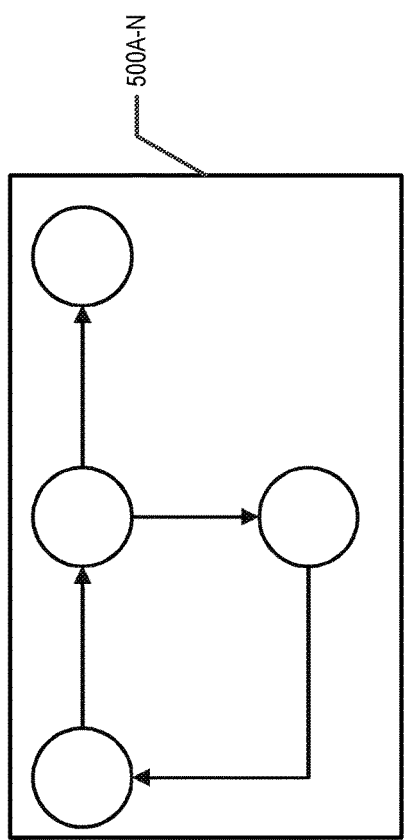
Figure 5B:
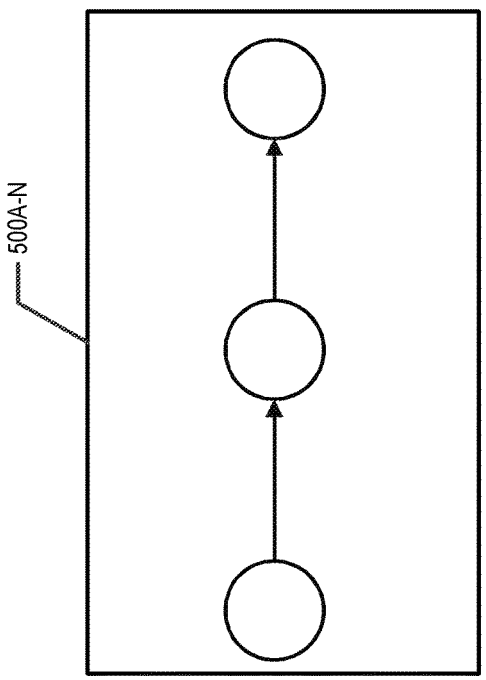
Figure 6A:
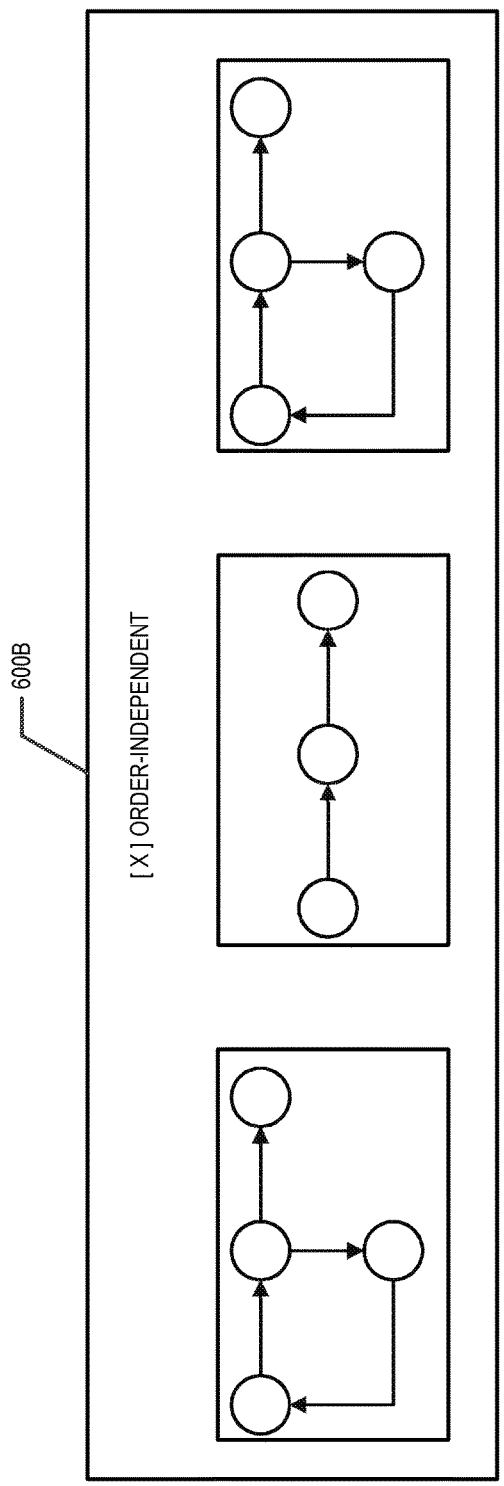
Figure 6B:
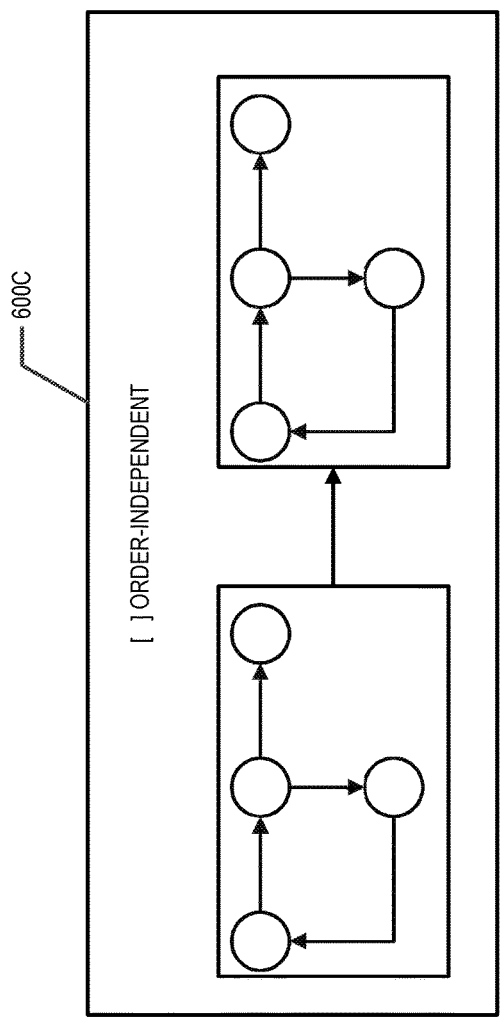
Figure 7:
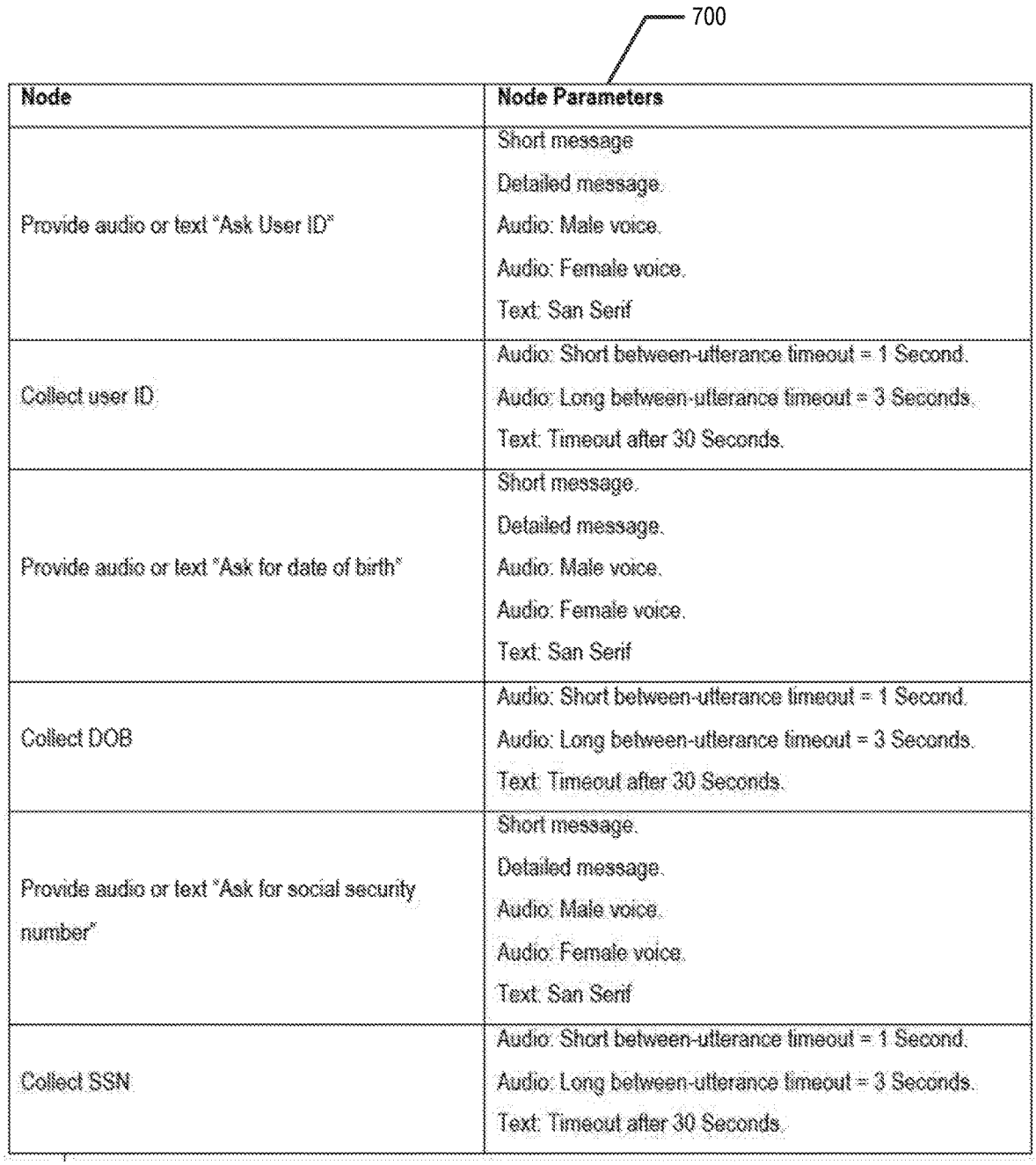
Figure 8:
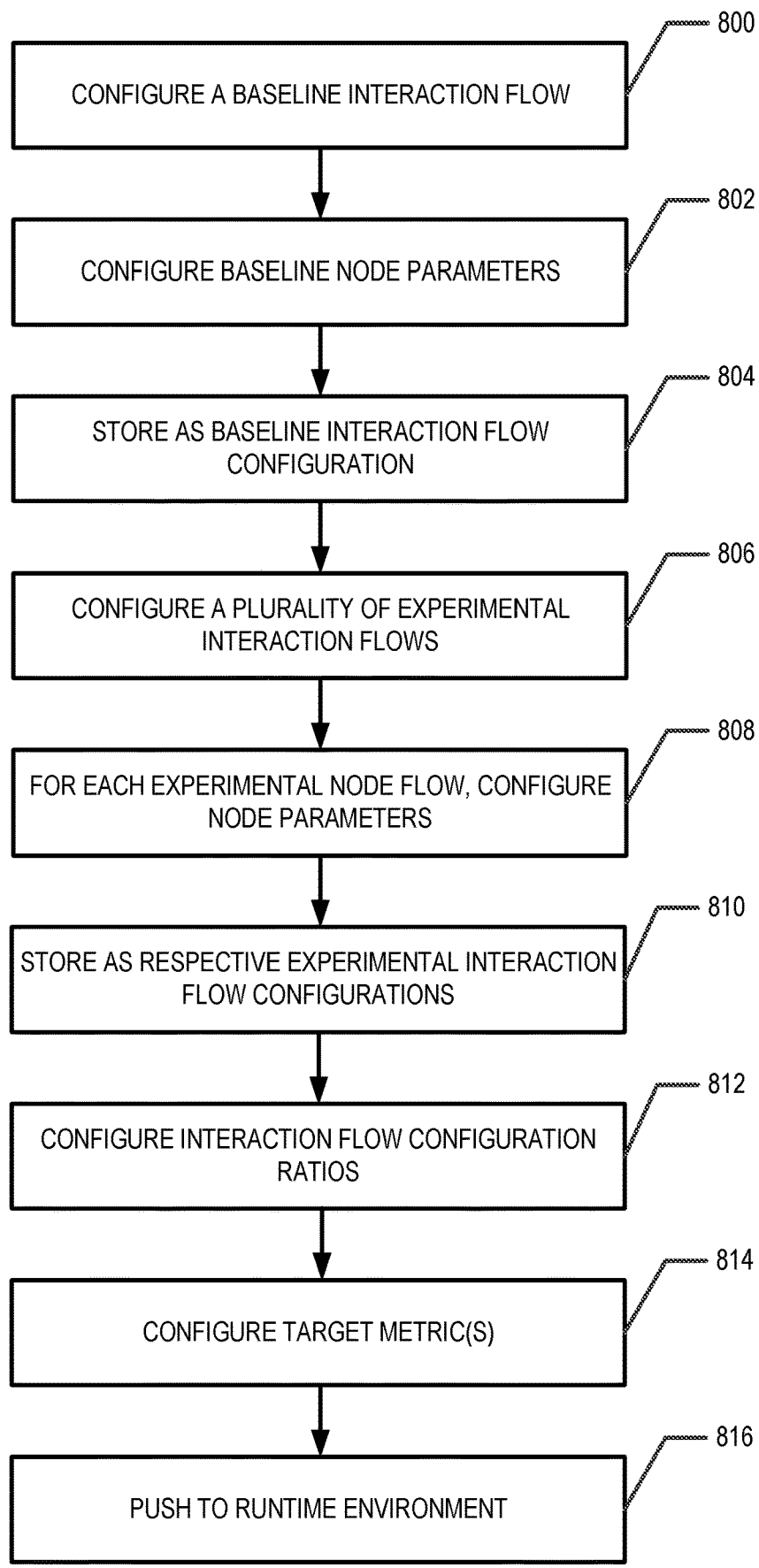
Figure 9:
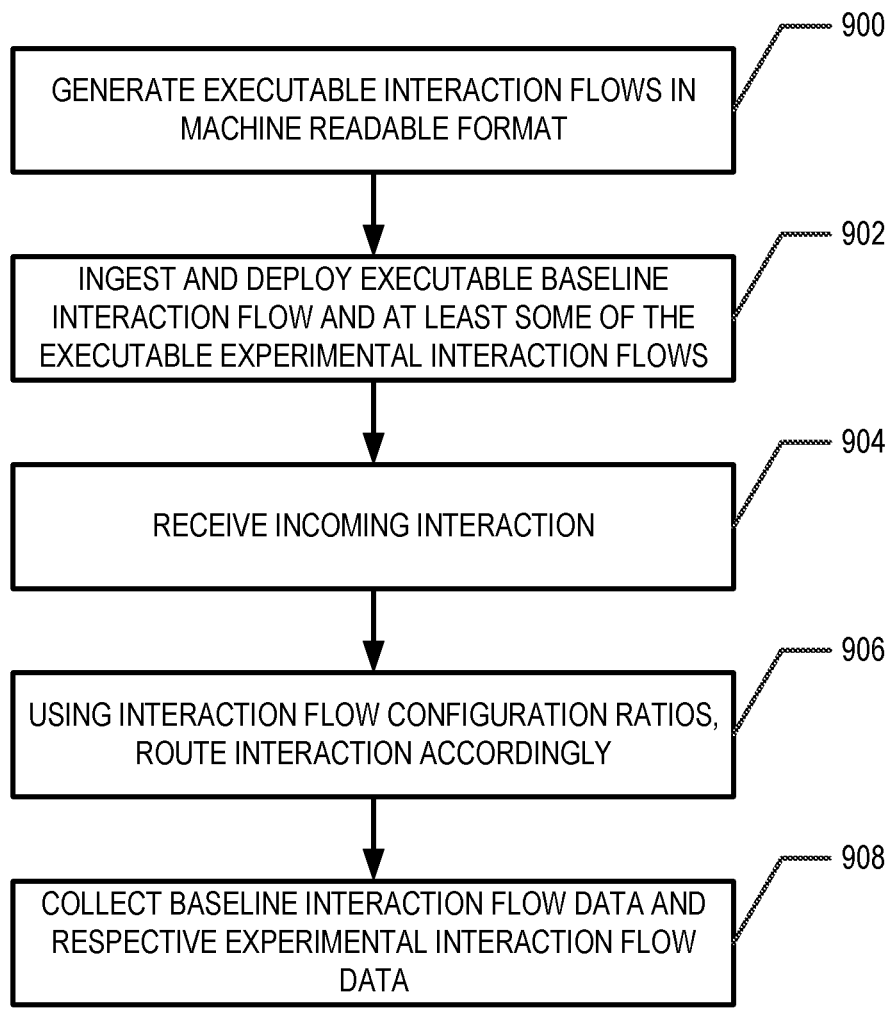
Figure 10:
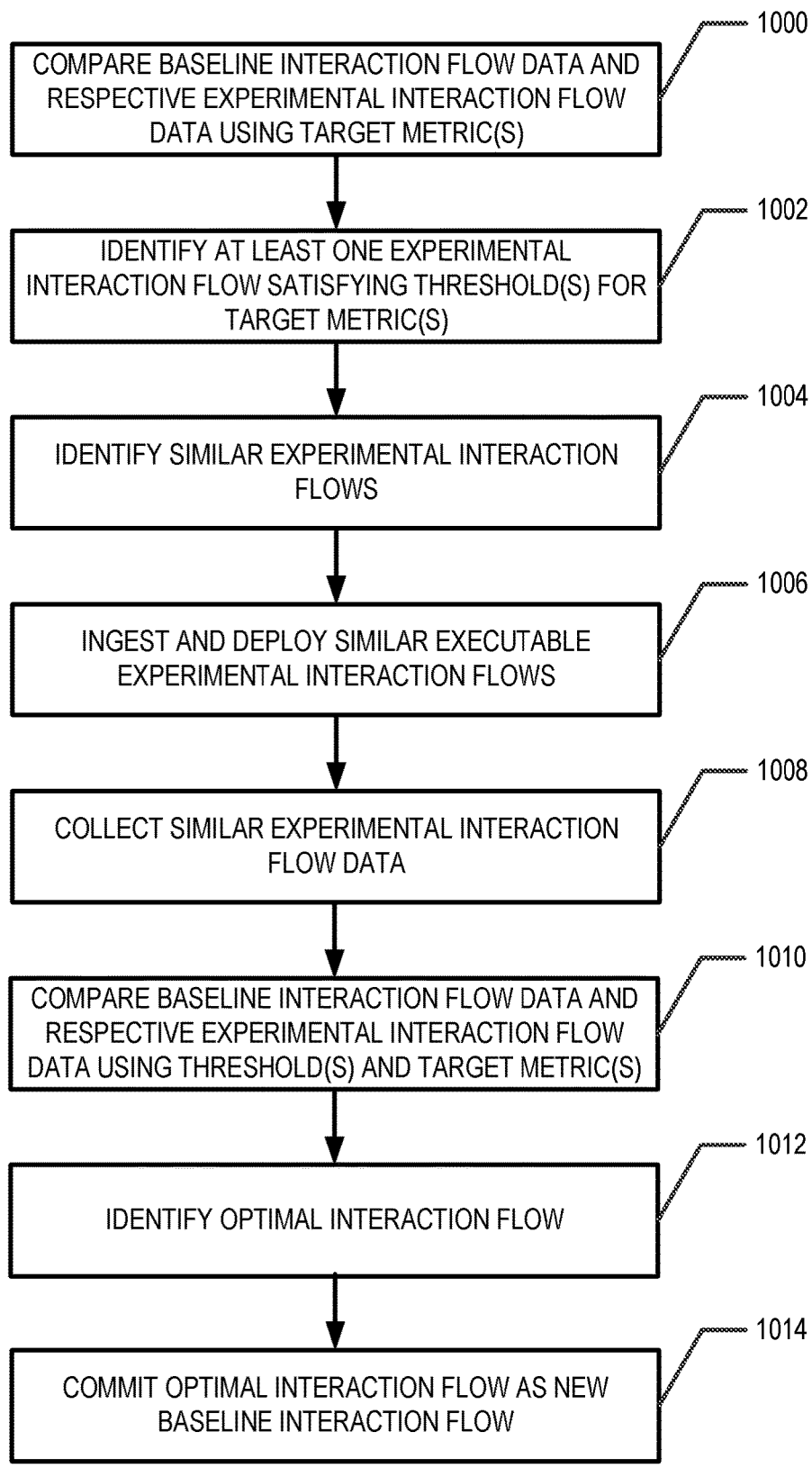
Figure 11A:
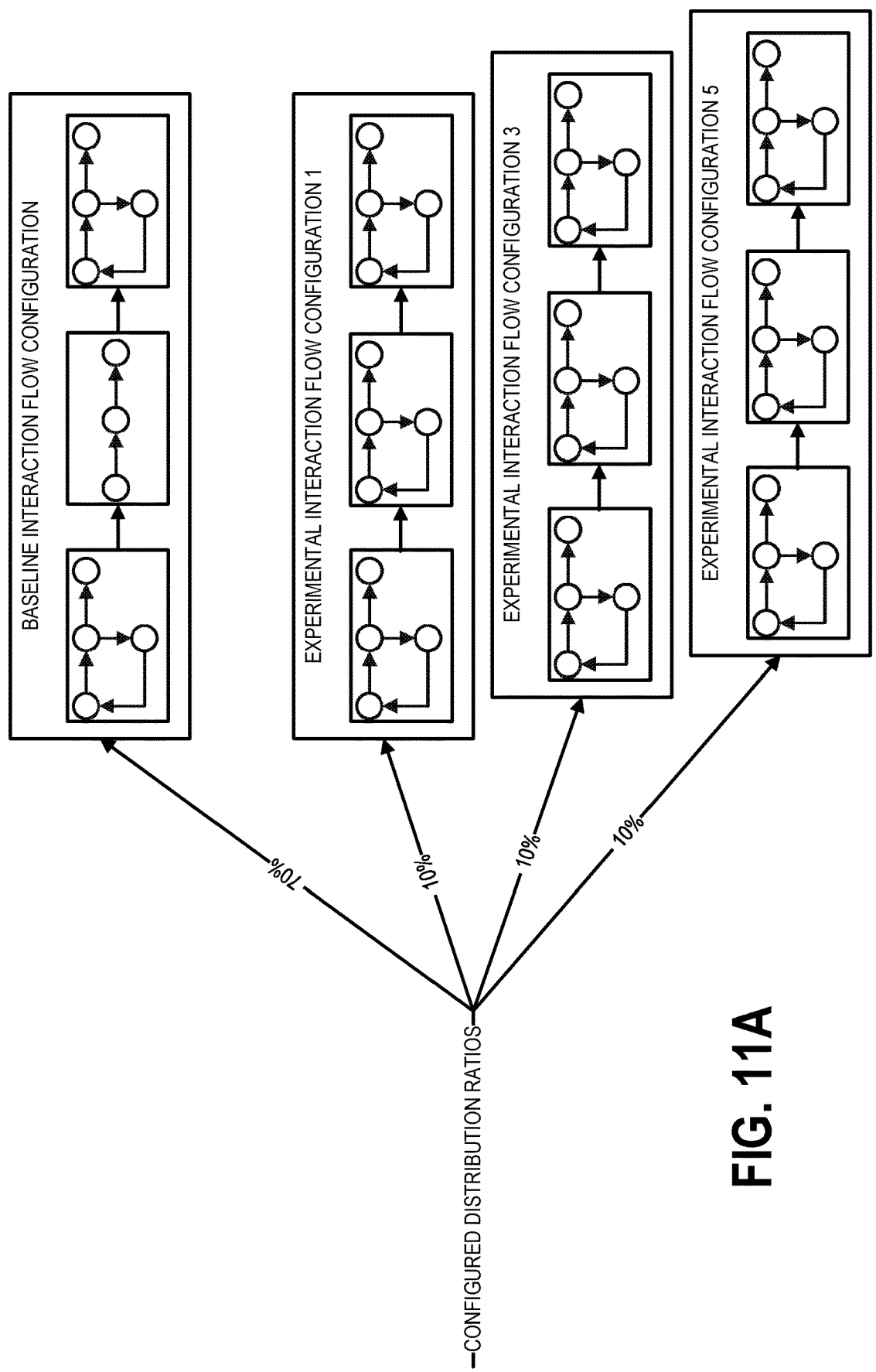
Figure 11B:
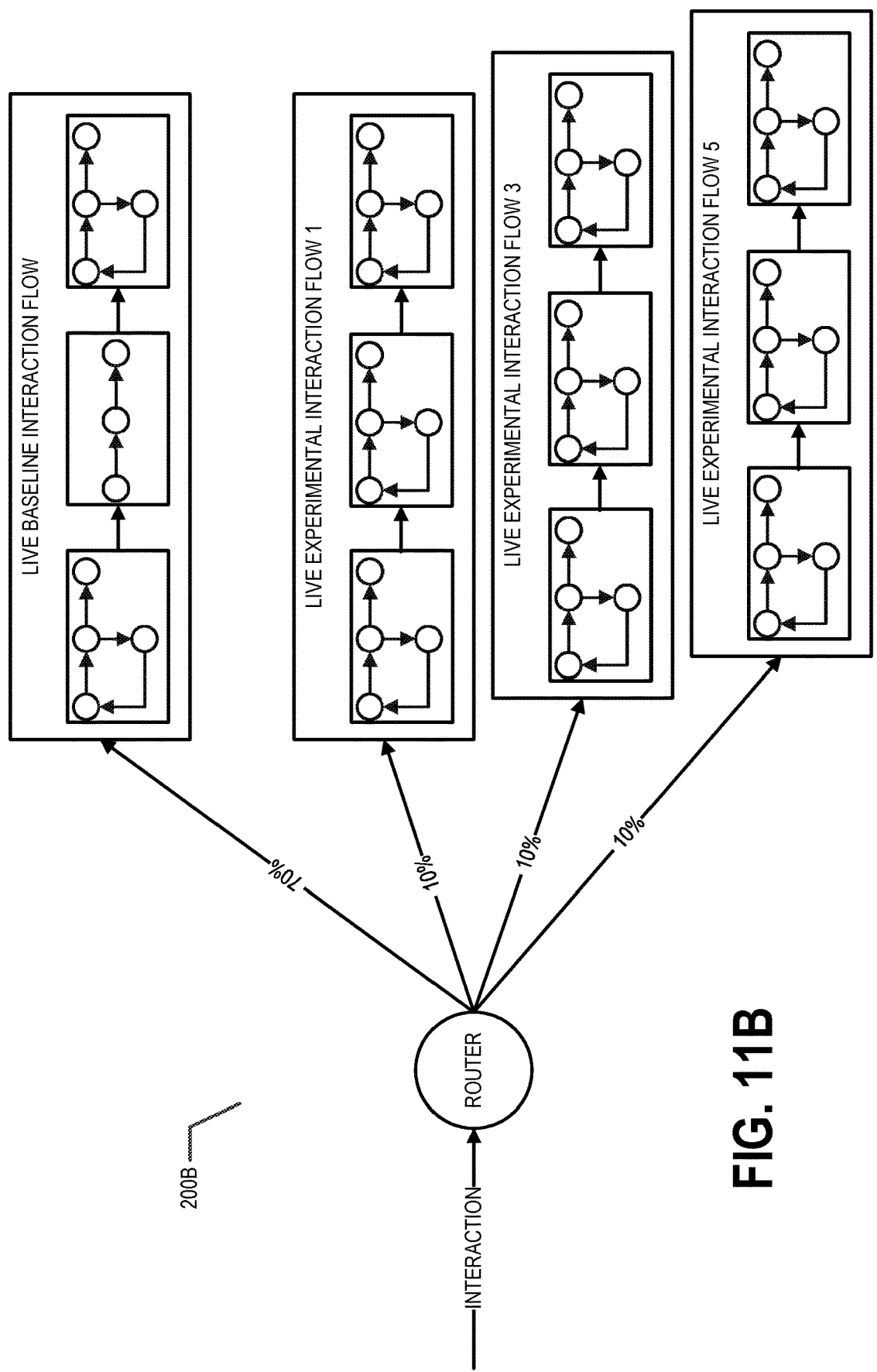

FIGS. 4A, 4B, and 4C show exemplary nodes, exemplary node groups, an exemplary grouping of a node group, and an exemplary interaction flow in accordance with certain embodiments of the present invention;

FIGS. 5A and 5B show exemplary node groups in accordance with certain embodiments of the present invention;

FIGS. 6A and 6B show exemplary groupings of node groups in accordance with certain embodiments of the present invention;

FIG. 7 shows exemplary node parameters/attributes in accordance with certain embodiments of the present invention;

FIGS. 8, 9, and 10 show exemplary flow charts in accordance with certain embodiments of the present invention; and FIGS. 11A and 11B show exemplary interaction distributions in accordance with certain embodiments of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
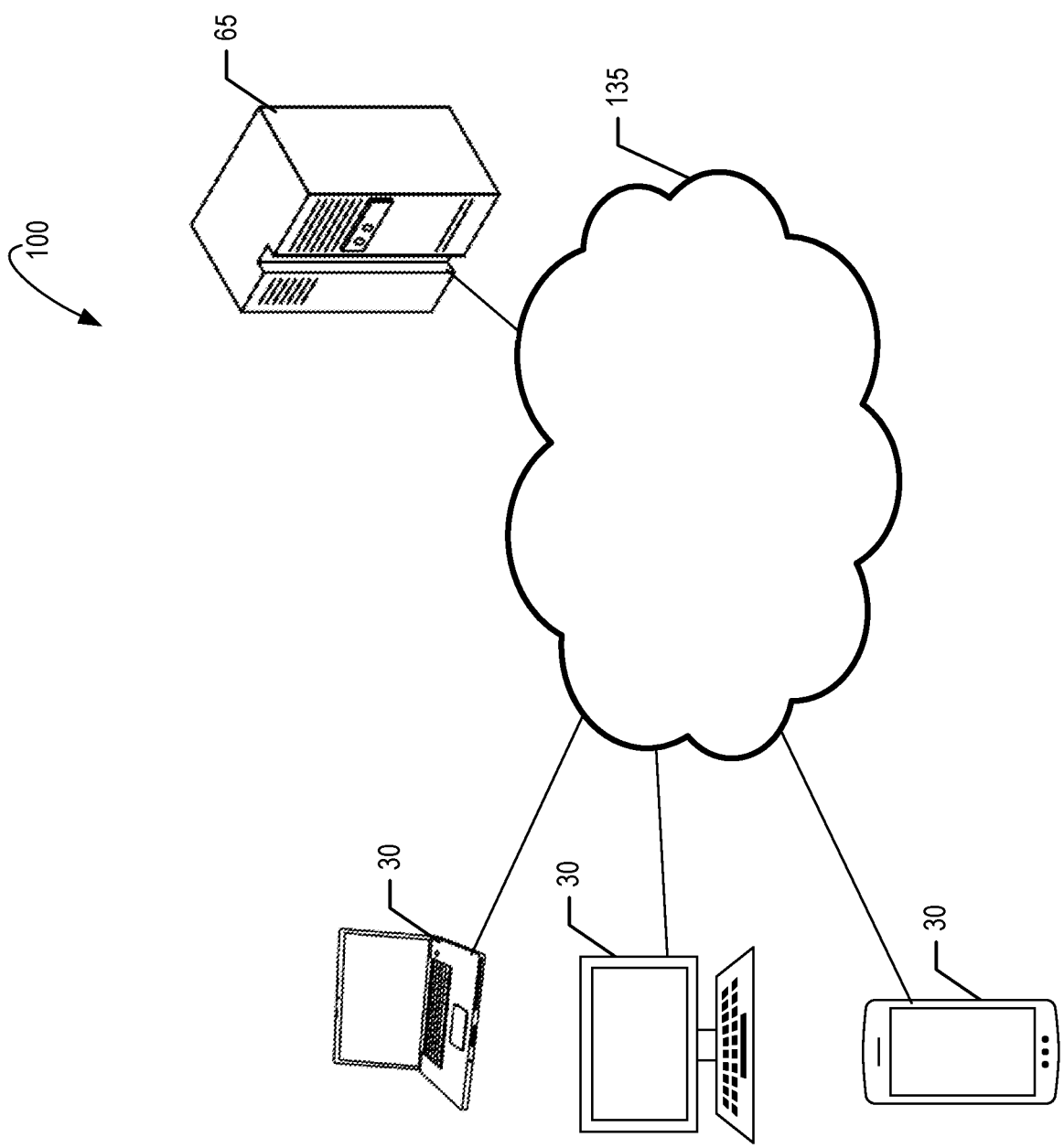
FIG. 1 is a diagram of an exemplary interaction platform that can be used in conjunction with various embodiments of the present invention.

FIG. 1 provides an illustration of an interaction platform 100 that can be used in conjunction with various embodiments of the present invention. As shown in FIG. 1, the interaction platform 100 may comprise one or more interaction server systems 65, one or more user computing entities 30, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary Interaction Server System

FIG. 2A provides a schematic of an exemplary interaction server system 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the interaction server system 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the interaction server system 65 may communicate with other computing entities, one or more user computing entities 30, and/or the like.

As shown in FIG. 2A, in one embodiment, the interaction server system 65 may include or be in communication with one or more processing elements 205 (also referred to as processors, processing circuitry, and/or similar terms used herein interchangeably) that communicate with other elements within the interaction server system 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

Figure 2B:
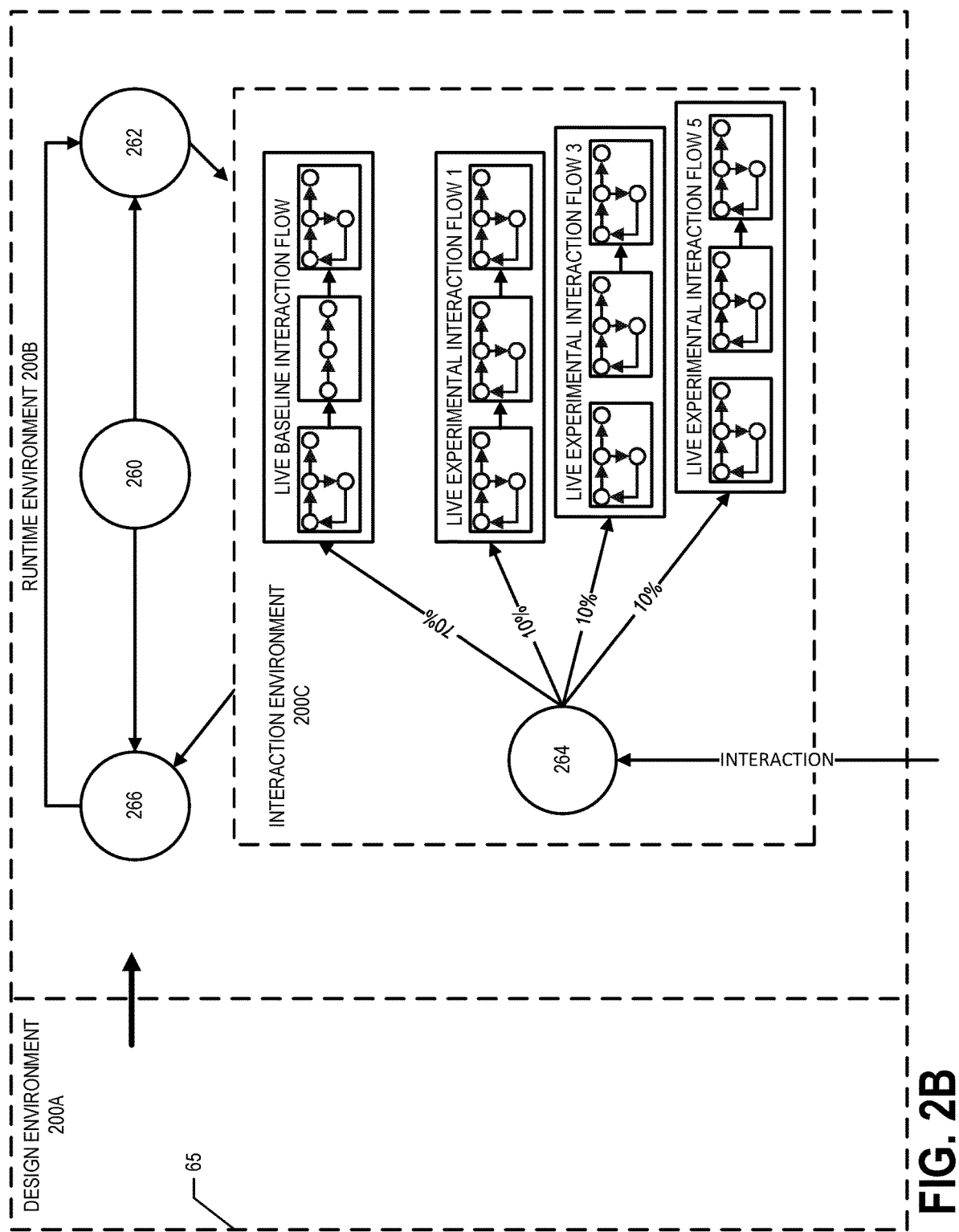
FIG. 2B is a schematic of exemplary environments of an interaction server system in accordance with certain embodiments of the present invention.

In one embodiment, shown in FIG. 2B, the interaction server system 65 may comprise a design environment 200A. The design environment 200A provides an environment in which users can configure interaction flows. The interaction server system 65 may also comprise a runtime environment 200B. The runtime environment 200B may include a configuration generator component. The configuration generator component 260 can process and understand the various annotations of interaction flow configurations. The annotations may include node order-dependent node flows, order-independent node flows, node attributes/parameters, and/or the like. The configuration generator component 260 then can generate "production" interaction flows in machine-readable format that can be deployed into the interaction environment 200C of the interaction server system 65 and/or other systems (by a deployer component 262). In interaction may be a chatbot environment, a digital assistant environment, an IVR environment, and/or the like. A production/live/functioning interaction flow is one that is available to be deployed as a "live" or "functioning" interaction flow (e.g., baseline interaction flow or experimental interaction flow) to handle interactions.

The runtime environment 200B may also include a deployer component 262. The deployer component 262 provides the interface between production/live/functioning interaction flows and interaction server systems 65 running on production. The deployer component 262 can ingest multiple production/live/functioning interaction flows from the configuration generator component 260 and deploy them to the interaction server system 65 for use. As noted, when deployed into the interaction environment 200C of the interaction server system 65, a production interaction flow may be referred to as a live interaction flow or a functioning interaction flow. The production/live/functioning interaction flows may include a baseline interaction flow and N experimental interaction flows, where "N" is a positive integer. Thus, the deployer component 262 deploys the logic that implements the routing of incoming interactions (e.g., calls, chats, conversations) through production/live/functioning interaction flows. The deployer component 262 can also setup or configure a router component 264, according to configurable distribution ratios. To enable this functionality, the deployer component 262 maintains a view of the production/live/functioning interaction flows with placeholders for the areas that can be replaced by configurable components (e.g., order independent flows and configurable attributes). The deployer component 262 can then fill the placeholders with specific values provided by the optimizer component 266 and deploy or update production/live/functioning interaction flows using application programming interfaces (APIs).

Thus, the router component 264 directs incoming interactions (e.g., calls, chats, conversations) to either the production/live/functioning baseline interaction flow or one of the N production/live/functioning experimental interaction flows. In one embodiment, the majority of interactions are directed to the production/live/functioning baseline interaction flow (assumed to be the most stable and providing the best performance for a target metric), with other interactions being directed to the N production/live/functioning experimental interaction flows. The exact percentages of interactions to be directed to the N production/live/functioning experimental interaction flows are configurable during design time with one or more probability values. For example, the router component 264 can direct interactions according to a randomly generated value from a uniform distribution, such that 70% of interactions being routed to the production/live/functioning baseline interaction flow, and 30% is evenly distributed among three production/live/functioning experimental interaction flows (see FIG. 11B).

And finally, the runtime environment 200B may also include an optimizer component 266. The optimizer component 266 collects information/data about interactions and executes an optimization strategy.

In one embodiment, the interaction server system 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the interaction system may be stored. As a person of ordinary skill in the art would recognize, the information/data required for the operation of the interaction system may also be partially stored in the cloud data storage system and partially stored in a locally maintained data storage system.

Memory media 206 may include information/data accessed and stored by the interaction system to facilitate the operations of the system. More specifically, memory media 206 may encompass one or more data stores configured to store information/data usable in certain embodiments.

In one embodiment, the interaction server system 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the interaction server system 65 with the assistance of the processing element 205 and operating system.

As indicated, in one embodiment, the interaction server system 65 may also include one or more network and/or communications interfaces 208 (e.g., for messages, for voice calls, for chats, and/or the like) for communicating with various computing entities, such as by communicating data, content, information, and/or similar terms used herein interchangeably that can be transmitted, received, operated on, processed, displayed, stored, and/or the like. For instance, the interaction server system 65 may communicate with computing entities or communication interfaces of other computing entities 65, user computing entities 30, and/or the like.

As indicated, in one embodiment, the interaction server system 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the interaction server system 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The interaction server system 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the interaction server's components may be located remotely from other interaction server system 65 components, such as in a distributed system. Furthermore, one or more of the components may be aggregated and additional components performing functions described herein may be included in the interaction server system 65. Thus, the interaction server system 65 can be adapted to accommodate a variety of needs and circumstances.

b. Exemplary User Computing Entity

Figure 3:
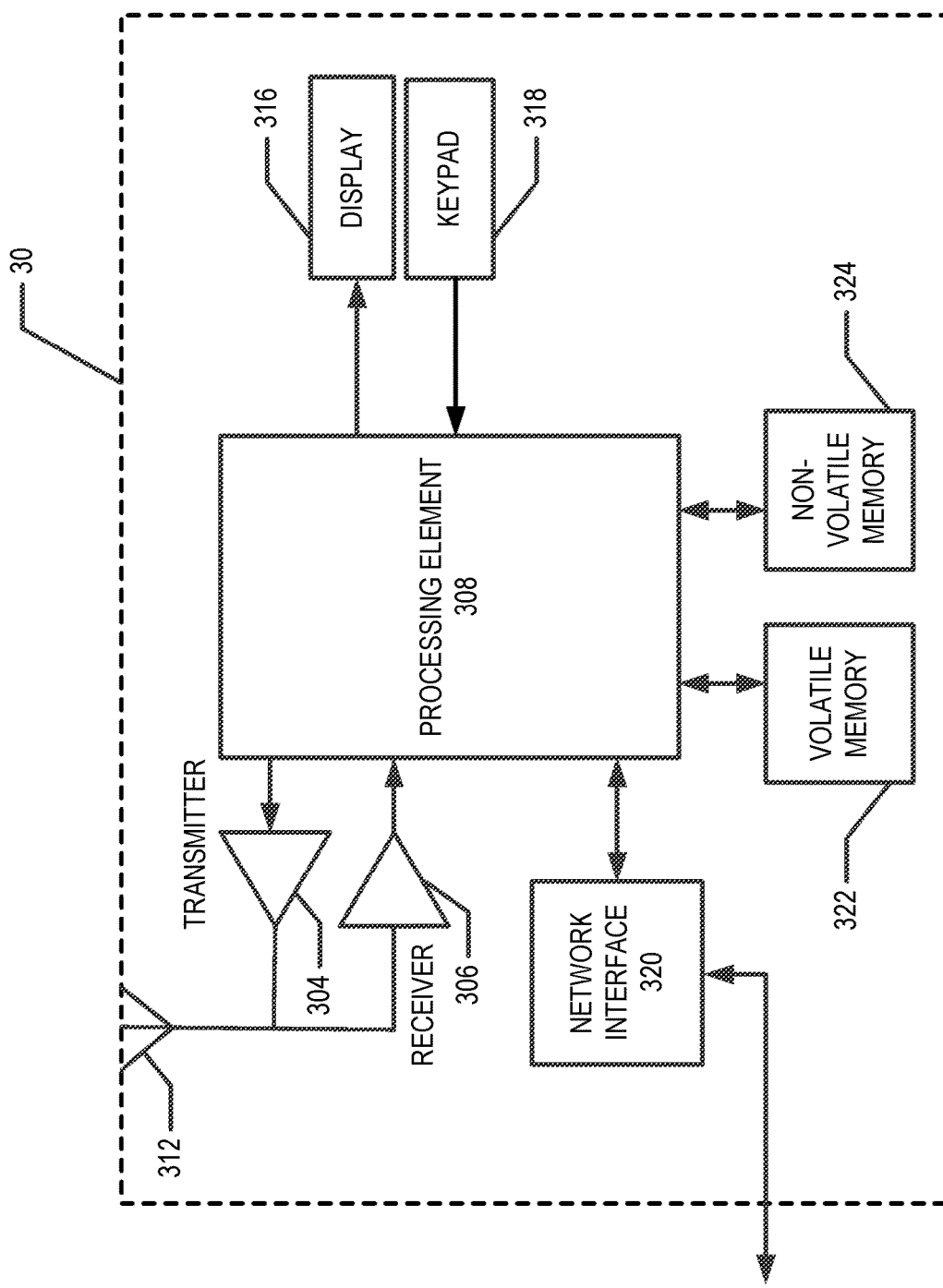
FIG. 3 is a schematic of an exemplary user computing entity in accordance with certain embodiments of the present invention.

FIG. 3 provides an illustrative schematic representative of user computing entity 30 that can be used in conjunction with embodiments of the present invention. As will be recognized, the user computing entity may be operated by an agent and include components and features similar to those described in conjunction with the interaction server system 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as an interaction server system 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MIMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the interaction server system 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. EXEMPLARY SYSTEM OPERATION

Reference will now be made to FIGS. 1, 2, 3, 4A, 4B, 4C, 5A, 5B, 6A, 6B, 7, 8, 9, 10, 11A, and 11B. FIG. 1 is a diagram of an exemplary interaction platform. FIG. 2A is a schematic of an exemplary interaction server system. FIG. 2B is a schematic of exemplary environments of an interaction server system. FIG. 3 is a schematic of an exemplary user computing entity. FIGS. 4A and 4B shows exemplary nodes, exemplary node groups, and an exemplary grouping of a node group. FIGS. 5A and 5B show exemplary node groups, and FIGS. 6A and 6B show exemplary groupings of node groups. FIG. 7 shows exemplary node parameters/attributes. FIGS. 8, 9, and 10 show exemplary flow charts. And FIGS. 11A and 11B show exemplary interaction distributions.

a. Technical Problem and Technical Solution a.1. Technical Problem

As will be recognized, at design time, it may be challenging to know which interaction flow will produce optimal values for target metrics, such as low abandonment rates, high authentication rates, low interaction times, low collection times, and/or the like. Additionally, each node, node group, and/or grouping of node groups may have various optimizable parameters/attributes. For example, if a node plays an audio file, one may be interested in knowing how users respond to different versions of that audio (e.g., length of and audio file or text, voices of an audio file, and/or the like).

Current methodologies for optimization require executing iterative experiments with human assistance. This current approach requires domain experts evaluating performance information/data and designing new interaction flows by formulating a hypothesis of what changes could yield improvements. This also requires developers to manually deploy new interaction flows and to manually repeat this iterative process.

Thus current approach is costly, time consuming, and requires reliance on operational teams based on domain expert intuition and best practices in order to keep the number of experiments within acceptable costs. Through applied effort and ingenuity, various embodiments overcome these technical challenges.

a.2. Technical Solution

To overcome at least the above-identified technical challenges, embodiments of the present invention provide approaches for programmatically annotating and exhaustively listing possible interaction flows from a master source, approaches for automatically optimizing interaction flows using one or more target metrics, extensions for various types of systems to programmatically adopt these approaches, and/or the like At least the above noted approaches provide many significant technical advantages of the current state of the art. For example, these approaches enable the safe evaluation of a large number of interaction flows without human intervention and with minimal impact on runtime environments. The approaches remove the need for manual evaluation and re-design of interaction flows in cases where such changes do not introduce new functionality (e.g., a reordering of existing nodes to improve performance). And these approaches enable systematic testing of configurations using global optimization techniques.

These approaches are optimization driven using artificial intelligence (AI) to avoid or limit human involvement. For example, using AI, there is no need to manually evaluate and repeat the iterative experimentation cycle. The only user input required can be at design time in annotating, marking, and/or describing the various possible interaction flows. This applies AI in the runtime environment to optimize the interaction flows.

b. Interaction Flows

Interaction platforms 100 can be used to provide audible, textual, and/or other prompts via conversational interfaces and menus that use business logic to control interaction flows to, for example, provide information/data to users, collect information/data before transferring the interaction to a human agent, provide automated responses to queries, and/or the like. The interaction flows may be implemented using nodes, node groups, and/or groupings of node groups. An interaction may be a voice call (e.g., voice-based interaction), a chat with a chatbot (e.g., textual-based interaction), a conversation with a digital assistant (e.g., voice-based interaction), and/or the like.

b.1. Interaction Flows: Nodes and Node Parameters/Attributes

In one embodiment, a node 400A-N may be an atomic output logic and/or an atomic input logic. For example, the atomic output logic may be playing an audio file via an IVR system, playing an audio file via a digital assistant (e.g., Alexa, Siri, etc.), providing textual output via a chatbot or digital assistant, and/or the like. The atomic input logic may collect (e.g., receive, capture, and/or similar words used herein interchangeably) information/data responsive to (e.g., after) requests from output logic via voice or textual input, capture an image, collected environmental information/data, and/or the like. Further, each node 400A-N may be identifiable using a one or more node identifiers, such as a Globally Unique Identifier (GUID).

Each node 400A-N can be connected to one or more other nodes 400A-N using flows/paths to create interaction flows. An interaction flow comprises one or more nodes 400A-N and one or more flows/paths to and from other nodes 400A-N.

FIG. 4A provides an exemplary interaction flow for verifying a user using three different personal identifiers. This interaction flow comprises eight individual nodes 400A-H. The lined arrows between each node represent the path/flow to and from other nodes 400A-N. For example, node 400A provides an output (e.g., audio or text) requesting a first personal identifier, such as a member ID number. Node 400B receives/collects an input (e.g., audio or text) of the first personal identifier. Then, node 400C provides an output (e.g., audio or text) requesting a second personal identifier (e.g., such as a date of birth), and node 400D receives/collects an input (e.g., audio or text) of the second personal identifier. Moving to node 400E, node 400E provides an output (e.g., audio or text) requesting a third personal identifier (e.g., such as a social security or PIN number), and node 400E receives/collects an input (e.g., audio or text) of the third personal identifier. In one embodiment, node 400G performs a verification using the first, second, and third personal identifiers; and node 400H can route the interaction (e.g., call or chat) to an agent or back to node 400A based on the verification that is performed. In another embodiment, the functionality of nodes 400G and 400H can be performed by system components other than nodes 400A-N.

As will be recognized, each node 400A-N is configurable. For example, each node 400A-N may have one or more configurable parameters/attributes. Exemplary configurable parameters/attributes are provided in FIG. 7. For example, node 400A-N that provides an audio output prompt/request may be configurable to provide a short audio message or a long audio message (with more detail than the short audio message). Further, the audio message may be configurable to use different voices (e.g., a female voice or a male voice), different languages, different vocal cadences, different playback speeds (e.g., 1×, 1.25×, 1.5×), and/or the like. Similarly, a node 400A-N that provides a textual prompt/request may be configurable to provide a short textual message or a long textual message. The textual message may be configurable to use different type of font, different font sizes, different textual colors for some or all of the textual message, pop-up windows, and/or the like. These configurable parameters/attributes can be defined by markings/annotations of interaction flow configurations that can be processed and understood by the configuration generator component 260, for example, of the interaction server system 65. For instance, each node attribute/parameter may be identifiable using an extension to the node, node group, or grouping of node groups. As will be recognized, various configurable parameters/attributes can be defined to adapt to a variety of needs and circumstances.

b.2. Interaction Flows: Node Groups

In one embodiment, the paths/flows between nodes 400A-N can be defined and/or controlled in a configurable matter. As noted, the paths/flows are represented by the lines and arrows to and from the nodes 400A-N, such as those shown in FIGS. 4A, 4B, 4C, 5A, 5B, 6A, and 6B. For simplified implementation of related node logic, to preserve the paths/flows to and from nodes 400A-N, and/or to preserve the order of execution of nodes 400A-N, node groups 500A-N can be used.

In one embodiment, a node group 500A-N comprises two more nodes 400A-N and one or more flows/paths to and from the nodes 400A-N. That is, a node group 500A-N stores two or more nodes 400A-N and their corresponding paths/flows. The node group 500A-N preserves the nodes 400A-N (with their logic) and their respective flows/paths for the group. A node group 500A-N, then, can be a collection of nodes 400A-N in the interaction graph with related functionality or groups themselves forming a hierarchical structure. By way of example, as shown in FIG. 4B, node group 500A includes node 400A (that provides audio or text requesting a first personal identifier) and node 400B (that collects the first personal identifier). Node group 500B includes node 400C (that provides audio or text requesting a second personal identifier) and node 400D (that collects the second personal identifier). Node group 500C includes node 400E (that provides audio or text requesting a third personal identifier) and node 400F (that collects the third personal identifier). Node group 500C includes node 400G (that performs a verification on the first, second, and third personal identifier) and node 400H (that either routes the interaction to an agent or back to node 400A). In these examples, the node groups 500A-N are used to store nodes 400A-N with their related node logic (e.g., providing a request and receiving a response) in logical groupings. Further, each node group 500A-N may be identifiable using a one or more node group identifiers, such as a GUID (along with any corresponding extensions for node parameters/attributes or node group parameters/attributes).

As will be recognized, node groups 500A-N and their respective nodes 400A-N can take various forms. FIGS. 5A and 5B show exemplary node groups 500A-N. In FIG. 5A, node group 500E comprises four separate nodes 400A-N and the corresponding possible flows/paths between each node 400A-N. In FIG. 5B, node group 500F comprises three separate nodes 400A-N and the corresponding possible flows/paths between each node. In one embodiment, the node groups 500A-N can order paths in an interaction flow, which in some embodiments can be modified without loss of functionality. In such an embodiment, a node group 500A-N comprises an interaction flow or a portion of an interaction flow.

In one embodiment, the paths/flows to and from nodes 400A-N in a node group 500A-N can be order-dependent or order-independent. An order-dependent node group 500A-N indicates that the flows/paths between the various nodes 400A-N within the group are executed in the configured order. An order-independent node group 500A-N indicates that the flows/paths between the various nodes 400A-N within the group can be executed in any order. For order-independent node groups 500A-N, it is possible to exhaustively list all interaction flows (e.g., all possible permutations) that preserve functionality. At design time, node groups 500A-N can be marked or annotated "order-dependent" or "order-independent" at any level in the hierarchy.

Returning the previous example with node groups 500A, 500B, 500C, and 500D, these four node groups could be executed in various orders with node group 500D being executed last. That is, node groups 500A, 500B, and 500C are order-independent, but node groups 500D is order-dependent in that is should be executed last. Thus, in this example, there are six possible permutations for executing these node groups. Table 1 provides the possible permutations for node groups 500A, 500B, 500C, and 500D.

TABLE 1

Permutation 1: 500A, 500B, 500C, 500D
Permutation 2: 500A, 500C, 500B, 500D
Permutation 3: 500B, 500A, 500C, 500D
Permutation 4: 500B, 500C, 500A, 500D
Permutation 5: 500C, 500A, 500B, 500D
Permutation 6: 500C, 500B, 500A, 500D b.3. Interaction Flows: Groupings of Node Groups In one embodiment, the paths/flows between node groups 500A-N can be defined and/or controlled in a configurable matter. As noted, the paths/flows are represented by the lines and arrows to and from the node groups 500A-N, such as those shown in FIGS. 4B, 4C, 5A, 5B, 6A, and 6B. For simplified implementation of related group logic, to preserve the paths/flows to and from node groups 500A-N, and/or to preserve the order of execution of node groups 500A-N, groupings of node groups 600A-N can be used.

In one embodiment, a grouping of node groups 600A-N comprises two more nodes groups 500A-N and one or more flows/paths to and from the nodes groups 500A-N. That is, a groupings of node groups 600A-N stores two or more nodes groups 500A-N and their corresponding paths/flows. A node group 600A-N preserves the node groups 500A-N (with their logic) and their respective flows/paths for the group. A grouping of node groups 600A-N, then, can be a collection of node groups 500A-N in the interaction graph with related functionality or groups themselves forming a hierarchical structure. By way of example, as shown in FIG. 4C, the grouping of node groups 600A includes node group 500A, node group 500B, node group 500C, and node group 500D.

As will be recognized, groupings of node groups 600A-N and their respective node groups 500A-N can take various forms. FIGS. 6A and 6B show exemplary groupings of node groups 600A-N. In FIG. 6A, grouping of node groups 600B comprises three separate node groups 500A-N. In this grouping of node groups, the possible flows/paths are not preserved because the grouping of node groups 600B is order-independent. In FIG. 6B, group node group 600C comprises two separate node groups 500A-N and the corresponding possible flows/paths between each node group 500A-N. As discussed with regard to node groups 500A-N, groupings of node groups 600A-N can order paths in an interaction flow, which in some embodiments can be modified without loss of functionality. In such an embodiment, a groups of node groups 600A-N comprises an interaction flow or a portion of an interaction flow. Further, each grouping of node groups 600A-N may be identifiable using a one or more grouping of node group identifiers, such as a GUID (along with any corresponding extensions for node parameters/attributes, node group parameters/attributes, and/or grouping of node groups parameters/attributes).

In one embodiment, the paths/flows to and from groups 500A-N in a grouping of node groups 600A-N can be order-dependent or order-independent. An order-dependent grouping of node groups 600A-N indicates that the flows/paths between the various node groups 500A-N are executed in the configured order. An order-independent grouping of node groups 600A-N indicates that the flows/paths between the various node groups 500A-N can be executed in any order. For order-independent groupings of node groups 600A-N, it is possible to exhaustively list all interaction flows (e.g., all possible permutations) that preserve functionality. At design time, groupings of node groups 600A-N can be marked or annotated "order-dependent" or "order-independent" at any level in the hierarchy.

c. Interaction Flow Configuration, Execution, and Optimization c.1. Design Time Configuration In one embodiment, with the configurability of nodes 400A-N, node groups 500A-N, and groupings of node groups 600A-N, baseline interaction flows can be configured in a manual, semi-automated, and/or automated manner (steps/operations 800-804 of FIG. 8) in compliance with, for example, business requirements. For instance, at design time, a user operating a user computing entity 30 can manually configure a baseline interaction flow via an interface (step/operation 800 of FIG. 8) to interact with the design environment 200A of the interaction server system 65. A baseline interaction flow is an interaction flow that is considered "production" and handles the majority of inbound interactions (e.g., calls, chats, conversations). The baseline interaction flow can also be used to optimize the interaction flow and compared to one or more target metrics of experimental interaction flows.

In one embodiment, the design of interaction flows can carried out via code changes or interactively through user interfaces. For example, nodes 400A-N, node groups 500A-N, and groupings of node groups 600A-N can be implemented as user interface extensions. In a user interface implementation, configuring the baseline interaction flow may include selecting (e.g., using annotations/markings and/or the like) existing nodes 400A-N, node groups 500A-N, and groupings of node groups 600A-N (and configuring their order-independence and/or order-dependence). Further, configuring the baseline interaction flow may include creating/generating (e.g., using annotations/markings and/or the like) new nodes 400A-N, new node groups 500A-N, and new groupings of node groups 600A-N (and configuring their order-independence and/or order-dependence). Still further, configuring the baseline interaction flow may also include defining (e.g., using annotations/markings and/or the like) the paths/flows to and from the nodes 400A-N, node groups 500A-N, and/or groupings of node groups 600A-N. And even further, configuring the baseline interaction flow may include selecting (e.g., using annotations/markings and/or the like) existing node parameters/attributes and/or creating/generating (e.g., using annotations/markings and/or the like) new node parameters/attributes (step/operation 802 of FIG. 8). Once configured, the baseline interaction flow is stored as a baseline interaction flow configuration (step/operation 804 of FIG. 8) in a manner that allows for it to be pushed (or pulled) from the design environment 200A to the runtime environment 200B for execution.

Similar to baseline interaction flows, experimental interaction flows can be configured in a manual, semi-automated, and/or automated manner (steps/operations 800-812 of FIG. 8) in compliance with, for example, business requirements. For instance, at design time, a user operating a user computing entity 30 can manually configure one or more experimental interaction flows via an interface (step/operation 806 of FIG. 8). An experimental interaction flow is an interaction flow that is an interaction flow that may be considered to replace the baseline interaction flow provided one or more target metrics are satisfied.

As previously noted, the design of interaction flows can take place via code changes or interactively through user interfaces. In a user interface implementation, configuring one or more experimental interaction flows may include selecting (e.g., using annotations/markings and/or the like) existing nodes 400A-N, node groups 500A-N, and groupings of node groups 600A-N (and configuring their order-independence and/or order-dependence). Further, configuring one or more experimental interaction flows may include creating/generating (e.g., using annotations/markings and/or the like) new nodes 400A-N, new node groups 500A-N, and new groupings of node groups 600A-N (and configuring their order-independence and/or order-dependence). Still further, configuring the one or more experimental interaction flows may also include defining (e.g., using annotations/markings and/or the like) the paths/flows to and from the nodes 400A-N, node groups 500A-N, and/or groupings of node groups 600A-N. And even further, configuring the one or more experimental interaction flows may include selecting (e.g., using annotations/markings and/or the like) existing node parameters/attributes and/or creating/generating (e.g., using annotations/markings and/or the like) new node parameters/attributes (step/operation 808 of FIG. 8). Once configured, the experimental interaction flows are stored as experimental interaction flow configurations in a manner that allows for them to be pushed (or pulled) from the design environment 200A to the runtime environment 200B for execution (step/operation 810 of FIG. 8). In one embodiment, the experimental interaction flow configurations can be stored as array data structures with each element corresponding to a chosen value (e.g., a node, node group, or grouping of node groups in order and/or corresponding parameters/attributes). For order dependent nodes, node groups, and groupings of node groups, the selection of the order can be determined/selected by, for example, the configuration generator component 260 in the runtime environment 200B. Similarly, some parameters/attributes may be similarly determined/selected from a list of parameters/attributes.

Continuing with the previous example, during design time, one baseline interaction flow and five experimental interaction flows can be configured and stored for later generation and execution. Table 2 provides the six possible interaction flow configurations.

TABLE 2

Baseline Interaction Flow Configuration: 500A, 500B, 500C, 500D
Experimental Interaction Flow Configuration 1: 500A, 500C, 500B, 500D
Experimental Interaction Flow Configuration 2: 500B, 500A, 500C, 500D
Experimental Interaction Flow Configuration 3: 500B, 500C, 500A, 500D
Experimental Interaction Flow Configuration 4: 500C, 500A, 500B, 500D
Experimental Interaction Flow Configuration 5: 500C, 500B, 500A, 500D Programmatically, these interaction flow configurations can be represented such that "static" nodes that are unaffected by the optimization process are omitted, and nodes appear in order as required for reassembly inside their respective order-independent node groups and/or groupings of node groups. In Table 3 below, the node groups are listed in order of execution and with specific parameters/attributes {groups} {node parameters/attributes}. As will be recognized, the parameters/attributes are provided for illustration (see FIG. 7). In Table 3, the interaction flow configuration can be used to represent any order of nodes, node groups, groupings of node groups, and parameters/attributes.

TABLE 3

500A, 500B, 500C, 500D, 500A.param = a1, 500B.param = b1, 500C.param = c1
500A, 500C, 500B, 500D, 500A.param = a1, 500B.param = b1, 500C.param = c1
500B, 500A, 500C, 500D, 500A.param = a2, 500B.param = b1, 500C.param = c2
500B, 500C, 500A, 500D, 500A.param = a2, 500B.param = b2, 500C.param = c1
500C, 500A, 500B, 500D, 500A.param = a1, 500B.param = b2, 500C.param = c2
500C, 500B, 500A, 500D, 500A.param = a1, 500B.param = b1, 500C.param = c2

As will be recognized, with various configurations for nodes 400A-N, node groups 500A-N, groupings of node groups 600A-N, and/or parameters/attributes, there may be many possible interaction flows. For example, the possible combinations of experimental interaction flows may grow exponentially with the number of parameters/attributes available. Thus, evaluating all possible scenarios may not feasible at a given time (e.g., running all possible scenarios simultaneously in the runtime environment).

In one embodiment, during design time, a user (e.g., operating a user computing entity 30) can configure one or more ratios for distributing incoming interactions in the runtime environment 200B to the baseline interaction flow and the one or more experimental interaction flows (step/operation 812 of FIG. 8). For example, the configurable distribution ratios may indicate that 70% of the incoming interactions be handled using the baseline interaction flow and that there only be three experimental interaction flows in production in the runtime environment 200B at a given time. Further, the configurable distribution ratios may indicate that each of the three experimental interaction flows should receive 10% of the incoming interactions based on a random selection of the experimental interaction flows (see FIG. 11A).

Further during design time, one or more target metrics for optimizing the interaction flows can be configured (step/operation 814 of FIG. 8). The target metrics may by a significant driver of positive user experiences for interactions. Exemplary target metrics include, but are not limited to, abandonment rate (e.g., the rate of user interactions disconnecting before solving a query), authentication rate (e.g., the rate of user interactions successfully identified by the interaction platform that reduces handling time by agents), information/data collection time, total interaction flow time, and/or the like. As will be recognized, a variety of approaches and techniques can be used to adapt to various needs and circumstances.

Once the configuration of the interaction flows is complete and the interaction flow configurations are stored, the interaction flow configurations can be pushed (or pulled) from the design environment 200A to the run time environment (step/operation 816 of FIG. 8). In the runtime environment 200B, multiple instances of the interaction flows can execute simultaneously and handle incoming interactions simultaneously.

c.2. Runtime Execution

In one embodiment, as previously described, the runtime environment 200B may include a configuration generator component 260. The configuration generator component 260 can process and understand the various annotations of interaction flow configurations (e.g., the baseline interaction flow configuration and the experimental interaction flow configurations). With this ability, the configuration generator component 260 of the interaction server system 65 can generate "production" interaction flows from the interaction flow configurations (step/operation 900 of FIG. 9). In a particular embodiment, the production interaction flows are in machine-readable format that can be deployed into the interaction environment 200C of the interaction server system 65 and/or other systems by a deployer component 262. A production interaction flow is one that is available to be deployed as a "live" or "functioning" interaction flow in production to handle interactions.

In one embodiment, the runtime environment 200B may also include a deployer component 262. The deployer component 262 can ingest multiple production/live/functioning interaction flows from the configuration generator component 260 and deploy them to the interaction server system 65 for handling incoming/inbound interactions (step/operation 902 of FIG. 9). The production/live/functioning interaction flows may include a baseline interaction flow and the experimental interaction flows.

In one embodiment, the deployer component 262 can also setup or configure a router component 264, according to the configurable distribution ratios. For example, the deployer component 262 can maintain a view of the production/live/functioning interaction flows with placeholders for the areas that can be replaced by configurable components (e.g., order independent flows and configurable attributes). Then, the deployer component 262 can fill the placeholders with specific values provided by the optimizer component 266 and deploy or update production/live/functioning interaction flows using APIs. Upon receiving an incoming/inbound interaction (e.g., call, chat, conversation), the router component 264 routes the incoming/inbound interaction to one of the production/live/functioning interaction flows based on the configured ratios (steps/operations 904, 906 and FIG. 11B). Continuing with the above example, the router component 264 can direct 70% of the incoming/inbound interactions to the production/live/functioning baseline interaction flow and 30% of production/live/functioning experimental interaction flows.

In one embodiment, it may be desirable to "ramp up" routing inbound interactions (e.g., calls, chats, conversations) to experimental interaction flows. That is, the interactions routed to interaction flows may start a percent lower than the configured percentage as a way of minimizing unanticipated failures. This approach provides an early-stopping mechanism that reduces the risk and effects of poorly configured experimental interaction flows.

Further, while the baseline interaction flow and the production/live/functioning experimental interaction flows, the optimizer component 266 can collect and record information/data about each interaction for one or more target metrics attributes (step/operation 908 of FIG. 9). The collected information/data may include interaction abandonments, interaction authentications, time to abandonment, time to authentication, total interaction flow time, total interaction time, information/data collection time, and/or the like. This collected information/data can be used to evaluate one or more target metrics and optimize the interactions.

c.3. Optimization

In one embodiment, as noted, the optimizer component 266 of the interaction server system 65 can collect and record information/data about each interaction. The collected information/data may then be used to optimize the interactions based at least in part on configurable optimization strategies using artificial intelligence, such as genetic algorithms, gradient based optimization, random searching, swarm intelligence, and/or the like. A plurality of approaches may exist in the optimizer component, and can be selected as the preferred optimization method at design time.

In one embodiment, the optimizer component 266 may optimize the nodes 400A-N, node groups 500A-N, and/or groupings of node groups 600A-N in the interaction flows. For example, the optimizer component 266 can compare the one or more target metrics for the baseline interaction flow to the one or more target metrics of each experimental interaction flow (step/operation 1000 of FIG. 10). For instance, the baseline interaction flow (e.g., 500A, 500B, 500C, 500D) may have an abandonment rate of 20%. In this example, experimental interaction flow configuration 1 (e.g., 500A, 500C, 500B, 500D) may have an abandonment rate of 26.5%, experimental interaction flow configuration 3 (e.g., 500B, 500C, 500A, 500D) may have an abandonment rate of 22%, and experimental interaction flow configuration 5 (e.g., 500C, 500B, 500A, 500D) may have an abandonment rate of 11.1%. The optimization analysis allows for the identification of the optimal nodes 400A-N, node groups 500A-N, and/or groupings of node groups 600A-N (and their respective orders of execution), and uses this information to iteratively produce new experimental flows that can be evaluated with respect to a target metric In addition to identifying the optimal nodes 400A-N, node groups 500A-N, and/or groupings of node groups 600A-N (and their respective orders of execution), the optimizer component 266 may optimize the parameters/attributes as well. To do so, the one or more target metrics may be used to identify the optimal node parameters/attributes, node group parameters/attributes, and/or groupings of node groups parameters/attributes. For instance, the interaction environment 200B can execute multiple instances of experimental interaction flows comprising the same nodes 400A-N, node groups 500A-N, and/or groupings of node groups 600A-N (with their respective orders of execution), but with different parameters/attributes. For example, Table 4 below shows experimental interaction flow configuration 5 (e.g., 500C, 500B, 500A, 500D) with a different set of parameters/attributes.

TABLE 4

| |
|---|
| 500C, 500B, 500A, 500D, 500A.param = a1, 500B.param = b1, 500C.param = c1 |
| 500C, 500B, 500A, 500D, 500A.param = a1, 500B.param = b1, 500C.param = c2 |
| 500C, 500B, 500A, 500D, 500A.param = a1, 500B.param = b2, 500C.param = c2 |
| 500C, 500B, 500A, 500D, 500A.param = a2, 500B.param = b1, 500C.param = c1 |
| 500C, 500B, 500A, 500D, 500A.param = a2, 500B.param = b1, 500C.param = c2 |
| 500C, 500B, 500A, 500D, 500A.param = a2, 500B.param = b2, 500C.param = c2 |

Thus, the optimization also optimizes the parameters/attributes. For example, Table 5 below shows example abandonment rates for experimental interaction flow configuration 5 with different parameters/attributes. As will be understood, optimizing the parameters/attributes may focus on a particular interaction flow of nodes 400A-N, node groups 500A-N, and/or groupings of node groups 600A-N. The experimental interaction flows in Table 5 may be considered one interaction flow with different parameters/attributes or five separate experimental interaction flows.

TABLE 5

| |
|---|
| 500C, 500B, 500A, 500D, 500A.param = a1, 500B.param = b1, 500C.param = c1 - 9% Aban. |
| 500C, 500B, 500A, 500D, 500A.param = a1, 500B.param = b1, 500C.param = c2 - 13% Aban. |
| 500C, 500B, 500A, 500D, 500A.param = a1, 500B.param = b2, 500C.param = c2 - 10.5% Aban |
| 500C, 500B, 500A, 500D, 500A.param = a2, 500B.param = b1, 500C.param = c1 - 11.5% Aban. |
| 500C, 500B, 500A, 500D, 500A.param = a2, 500B.param = b1, 500C.param = c2 - 12% Aban. |
| 500C, 500B, 500A, 500D, 500A.param = a2, 500B.param = b2, 500C.param = c2 - 10.8% Aban |

In one embodiment, as indicated in step/operation 1002 of FIG. 10, the optimizer component 266 can identify experimental interaction flows within one or more configurable thresholds. The one or more configurable thresholds can take many forms. In one embodiment, the one or more configurable thresholds may be an abandonment rate within a specified percentage of the baseline interaction flow, an interaction time below a specified time, an authentication above equal to or above a minimum acceptable threshold, and/or the like.

In one embodiment, at step/operation 1004, the optimizer component 266 can identify similar experimental interaction flows to the experimental interaction flows satisfying the one or more thresholds. Identifying similar experimental flows can be achieved with optimization methods used in artificial intelligence. To illustrate how the optimization process may work, a general approach is the use of stochastic "hill climbing" algorithm: given an experimental flow, the optimizer component 266 can generate similar flows by introducing small, controlled changes (for example, changing the value of a single parameter) to its flow configuration so that the generated flows are new, but preserve many characteristics of the originating flow configuration—i.e. the new flows are considered within a close "neighborhood" of the originating flow. If any of the new flow configurations provide an improvement on a metric of interest, the process is repeated, now applying a small change to the selected new flow. Variations of this approach apply different heuristics to generating candidate new flows. Furthermore, another example approach can be seen in the application of genetic algorithms, where the optimizer component 266 may maintain a population of flows and combines or "mutates" their configuration in a process that mimics gene recombination during reproduction in nature.

The similar experimental interaction flows can be automatically configured, ingested, and deployed to handle incoming/inbound interactions (step/operation 1006 of FIG. 10). Further, the optimizer component 266 of the interaction server system 65 can collect and record information/data about each interaction for the baseline interaction flow, any experimental interaction flows, and/or any similar experimental interaction flows. Then, the process as previously described can be used to continue the optimization. For example, the optimizer component 266 can continue to optimize the nodes 400A-N, node groups 500A-N, and/or groupings of node groups 600A-N in the interaction flows.

The optimizer component 266 can also continue to optimize the various parameters/attributes (steps/operations 1008, 1010 of FIG. 10).

In one embodiment, the optimizer component 266 is iterative until the optimal interaction flow is identified (step/operation 1012 of FIG. 10). The optimizer component 266 can commit, persist, update, replace with, and/or similar words used herein interchangeably the optimal interaction flow as the baseline interaction flow (step/operation 1014 of FIG. 10). Committing the optimal interaction flow as the baseline interaction flow provides for using the optimal interaction flow to handle the majority of interactions and allows for further optimizations as new parameters/attributes, nodes 400A-N, node groups 500A-N, and/or groupings of node groups 600A-N become available (or until all possible combinations have been evaluated). The committing can occur at any point in the optimization process. For example, if the improvement seen during is X % more significant than the baseline interaction flow), the optimizer component 266 can automatically carry out the change without human intervention to improve the efficiency and functioning of the interaction server system 65. As will be recognized, a variety of other approaches and techniques can be used to adapt to various needs and circumstances.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method for optimizing interaction flows, the method comprising:
receiving, via one or more processors, an inbound interaction, wherein the inbound interaction is selected from the group consisting of a voice-based interaction and a textual-based interaction;
determining, via the one or more processors, whether to route the inbound interaction to a baseline interaction flow or to a first experimental interaction flow of a plurality of experimental interaction flows based at least in part on a configurable distribution ratio, wherein (a) the baseline interaction flow comprises a plurality of baseline interaction nodes and at least one defined path for executing each of the plurality baseline interaction nodes, (b) each of the plurality of experimental interaction flows comprises a plurality of experimental interaction nodes and at least one defined path for executing each of the plurality of experimental interaction nodes, and (c) the configurable distribution ratio defines the distribution of inbound interactions for the baseline interaction flow and the first experimental interaction flow;
responsive to determining to route the inbound interaction to the first experimental interaction flow based at least in part on the configurable distribution ratio, routing, via the one or more processors, the inbound interaction to the first experimental interaction flow;
after routing the inbound interaction to the first experimental interaction flow, automatically determining, via the one or more processors, that the first experimental interaction flow satisfies a threshold for a target metric; and
responsive to automatically determining that the first experimental interaction flow satisfies the threshold for the target metric, committing, via the one or more processors, the first experimental interaction flow as the baseline interaction flow, thereby changing the distribution ratio for the first experimental interaction flow.

2. The computer-implemented method of claim 1, wherein the target metric is selected from the group consisting of an abandonment rate, an authentication rate, and an interaction time.

3. The computer-implemented method of claim 1, wherein each of the plurality of experimental interaction nodes comprises one or more parameters.

4. The computer-implemented method of claim 1, wherein each experimental interaction flow is stored as an experimental interaction flow configuration.

5. The computer-implemented method of claim 1, wherein each experimental interaction flow configuration is pushed to a runtime environment, generated in a machine-readable format, and handles inbound interactions.

6. The computer-implemented method of claim 1 further comprising: collecting baseline interaction flow data; and for each experimental interaction flow, collecting experimental interaction flow data.

7. A computer program product comprising a non-transitory computer readable medium having computer program instructions stored therein, the computer program instructions when executed by a processor, cause the processor to:
receive an inbound interaction, wherein the inbound interaction is selected from the group consisting of a voice-based interaction and a textual-based interaction;
determine whether to route the inbound interaction to a baseline interaction flow or to a first experimental interaction flow of a plurality of experimental interaction flows based at least in part on a configurable distribution ratio, wherein (a) the baseline interaction flow comprises a plurality of baseline interaction nodes and at least one defined path for executing each of the plurality baseline interaction nodes, (b) each of the plurality of experimental interaction flows comprises a plurality of experimental interaction nodes and at least one defined path for executing each of the plurality of experimental interaction nodes, and (c) the configurable distribution ratio defines the distribution of inbound interactions for the baseline interaction flow and the first experimental interaction flow;
responsive to determining to route the inbound interaction to the first experimental interaction flow based at least in part on the configurable distribution ratio, route the inbound interaction to the first experimental interaction flow;
after routing the inbound interaction to the first experimental interaction flow, automatically determine that the first experimental interaction flow satisfies a threshold for a target metric; and
responsive to automatically determining that the first experimental interaction flow satisfies the threshold for the target metric, commit the first experimental interaction flow as the baseline interaction flow, thereby changing the distribution ratio for the first experimental interaction flow.

8. The computer program product of claim 7, wherein the target metric is selected from the group consisting of an abandonment rate, an authentication rate, and an interaction time.

9. The computer program product of claim 7, wherein each of the plurality of experimental interaction nodes comprises one or more parameters.

10. The computer program product of claim 7, wherein each experimental interaction flow is stored as an experimental interaction flow configuration.

11. The computer program product of claim 7, wherein each experimental interaction flow configuration is pushed to a runtime environment, generated in a machine-readable format, and handles inbound interactions.

12. The computer program product of claim 7, wherein the computer program instructions when executed by a processor, further cause the processor to:
collect baseline interaction flow data; and
for each experimental interaction flow, collect experimental interaction flow data.

13. A computing system comprising a non-transitory computer readable storage medium and one or more processors, the computing system configured to:
receive an inbound interaction, wherein the inbound interaction is selected from the group consisting of a voice-based interaction and a textual-based interaction;
determine whether to route the inbound interaction to a baseline interaction flow or to a first experimental interaction flow of a plurality of experimental interaction flows based at least in part on a configurable distribution ratio, wherein (a) the baseline interaction flow comprises a plurality of baseline interaction nodes and at least one defined path for executing each of the plurality baseline interaction nodes, (b) each of the plurality of experimental interaction flows comprises a plurality of experimental interaction nodes and at least one defined path for executing each of the plurality of experimental interaction nodes, and (c) the configurable distribution ratio defines the distribution of inbound interactions for the baseline interaction flow and the first experimental interaction flow;

responsive to determining to route the inbound interaction to the first experimental interaction flow based at least in part on the configurable distribution ratio, route the inbound interaction to the first experimental interaction flow;

after routing the inbound interaction to the first experimental interaction flow, automatically determine that the first experimental interaction flow satisfies a threshold for a target metric; and responsive to automatically determining that the first experimental interaction flow satisfies the threshold for the target metric, commit the first experimental interaction flow as the baseline interaction flow, thereby changing the distribution ratio for the first experimental interaction flow.

14. The computing system of claim 13, wherein the target metric is selected from the group consisting of an abandonment rate, an authentication rate, and an interaction time.

15. The computing system of claim 13, wherein each of the plurality of experimental interaction nodes comprises one or more parameters.

16. The computing system of claim 13, wherein each experimental interaction flow is stored as an experimental interaction flow configuration.

17. The computing system of claim 13, wherein each experimental interaction flow configuration is pushed to a runtime environment, generated in a machine-readable format, and handles inbound interactions.

18. The computing system of claim 13, wherein the computing system is further configured to:
  collect baseline interaction flow data; and
  for each experimental interaction flow, collect experimental interaction flow data.

\* \* \* \* \*